Patented July 10, 1928.

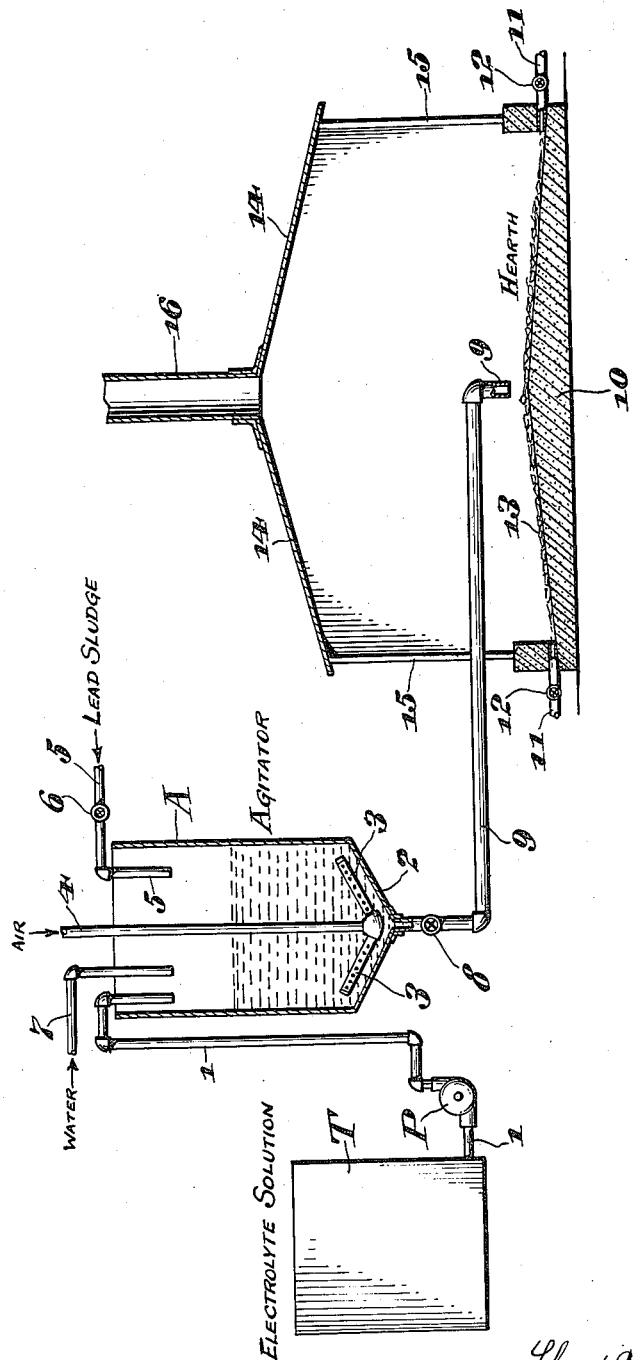

1,676,294

UNITED STATES PATENT OFFICE.

LLOYD B. SMITH AND GEORGE W. JAMISON, OF PHILADELPHIA, PENNSYLVANIA, ASSIGNORS TO THE ATLANTIC REFINING COMPANY, OF PHILADELPHIA, PENNSYLVANIA, A CORPORATION OF PENNSYLVANIA.

SLUDGE TREATMENT.

Application filed November 9, 1925. Serial No. 67,835.

Our invention relates to the disposal of sludge formed in the treatment of petroleum products with alkaline litharge solution.

In accordance with our invention sludge of this character is easily and cheaply treated for recovery of the lead, particularly in a form suitable for smelting, by applying a solution of an electrolyte, followed by separation of water from the solid material and the retained oil, which latter is ignited to produce a dry, oil-free solid or ash containing a high percentage of lead.

In refining light petroleum distillates, such as naphthas and burning oils, for removal of objectionable sulphur compounds, it is customary to agitate the oil with an alkaline solution of sodium plumbite with or without the addition of free sulphur. There results a heavy black sludge, commonly known to oil refiners as "black-strap", which comprises largely lead sulphide and organic lead compounds in an oil and water emulsion, which last, in accordance with our invention, is broken by any suitable method, preferably by applying the aforesaid electrolyte, to make possible the separation of the water, and the subsequent ignition of the oil as aforesaid to produce oil-free solids containing the lead.

The disposal of the sludge or black-strap referred to has been a problem in oil refineries because the nature of the material is such that it may not be run to the sewer because its oil content causes pollution of the water into which the sewer discharges, and because it is not feasible to remove the oil in the separators commonly used in the refineries, since the sludge or black-strap causes emulsification of the oil and water in the separators. It is, therefore, desirable to dispose of this waste product in a way to minimize expense and to recover the valuable lead content.

For an understanding of our process and an illustration of a form of apparatus for practicing it, reference is to be had to the accompanying drawing which is a vertical sectional view, partly in elevation, of a system utilizable in accordance with our invention.

In a storage tank T is provided a concentrated aqueous solution of an electrolyte, preferably calcium chloride, which is delivered by pump P through the pipe 1 into the agitator tank A, preferably provided with the conical bottom 2, and having therein the perforated pipes 3, to which air or steam is delivered through the pipe 4. The pipe 5, controlled by valve 6, serves to deliver black-strap or sludge into the agitator A; and pipe 7 serves to supply water.

In operating, to the concentrated electrolyte solution in the agitator A there is added, through the pipe 7, water in quantity sufficient to effect an aqueous solution containing about 10%, by weight, of the electrolyte. Approximately an equal volume of sludge or black-strap is then added through the pipe 5, and during the addition of the sludge the mixture is agitated by the air or steam issuing from the pipes 3 and blown upwardly through the contents of tank A.

As the black-strap comes into contact with the solution of calcium chloride, or equivalent, the emulsion is broken, the water separating from the oil, and the latter is apparently adsorbed by the solid lead sulphide and the calcium hydroxide formed by the reaction between the calcium chloride present in the solution and the sodium hydroxide present in the sludge. The sodium chloride resulting from the reaction and some of the electrolyte or calcium chloride remains in solution in the water.

After the aforesaid agitation for a suitable length of time, the valve 8 is opened and the mixture flows by gravity or is pumped from agitator A through the pipe 9 to the hearth 10 or equivalent. It is preferable to continue the agitation of the material in the agitator A as it is withdrawn to the hearth 10 to prevent separation or settling out of solids likely to clog the discharge pipe 9.

The hearth 10 may be of any suitable material, as firebrick, and is preferably sloped from its center to the outer edges where there are provided drain or draw off pipes 11, controlled by valves 12, which latter are closed at beginning of discharge of the material from agitator A through the pipe 9.

As the mixture passes from the agitator onto hearth 10, the solid material settles upon the hearth, and, as the level of the liquid or water rises, the valves 12 are opened, drawing off the liquid which is discharged to the sewer.

The solid material, left on the hearth after withdrawal of the liquid portion of the mixture is in the form of a heavy black paste containing about 20% to 25% oil and about 10% water. The oil is ignited and the heat of its combustion drives off the contained water, leaving a dry friable solid 13, containing about 40% metallic lead, largely in the form of oxide and sulphide. Upon cooling the residue is scraped off the hearth 10 and may be transported to storage and later smelted to recover the lead.

As indicated, there may be disposed above the ignition hearth 10, a roof, 14, supported by columns 15, and provided with a stack 16.

As one example of our method, there is described a process as follows:

In an agitator of 3000 gallons capacity, 1000 gallons black-strap or sludge is mixed for a period of about fifteen minutes with 1000 gallons of 10% aqueous solution of calcium chloride. The mixture is then passed to the hearth 10, the water drawn off through the pipes 11, whereupon the oil in the remaining solids is ignited and burns for about five or six hours, yielding about 2300 pounds of dry porous residue, having a metallic lead content of about 40%.

While calcium chloride is our preferred electrolyte, because of its efficient action and relatively low cost, it will be understood that any other suitable electrolyte may be utilized. We have found that the best results are obtained with salts of polyvalent metals such as calcium chloride, barium chloride or aluminum sulphate.

For brevity in the appended claims, the term "lead sludge" will be understood to refer to a sludge of the character herein described.

What we claim is:

1. A method for recovering lead from sludge resulting from the treatment of petroleum oil with a compound of lead, which comprises treating the sludge with a substance to break the emulsion of oil and water, removing the water which separates, and igniting the remainder, whereby the oil content thereof is burned leaving a solid having a relatively high lead content.

2. A method for recovering lead from sludge resulting from the treatment of petroleum oil with a compound of lead, which comprises treating the sludge with calcium chloride to break the emulsion of oil and water, removing the water which separates, and igniting the remainder, whereby the oil content thereof is burned to drive off the remaining water and leave a solid free of oil and water and having a relatively high lead content.

3. A method for recovering lead from sludge which comprises agitating the sludge with a solution of an electrolyte to break the emulsion of oil and water, settling the solid material from the resultant mixture, withdrawing the aqueous layer, and igniting the remainder whereby the oil content thereof is burned leaving a solid having a relatively high lead content.

LLOYD B. SMITH.
GEORGE W. JAMISON.